(12) United States Patent
Wang et al.

(10) Patent No.: US 10,756,650 B2
(45) Date of Patent: Aug. 25, 2020

(54) TUBULAR FRICTION NANOGENERATOR AND CLOTH AND ENERGY SHOE INCLUDING THE SAME

(71) Applicant: BEIJING INSTITUTE OF NANOENERGY AND NANOSYSTEMS, Beijing (CN)

(72) Inventors: Zhonglin Wang, Beijing (CN); Jie Wang, Beijing (CN); Shengming Li, Beijing (CN); Fang Yi, Beijing (CN)

(73) Assignee: BEIJING INSTITUTE OF NANOENERGY AND NANOSYSTEMS, Beijing (CN)

( * ) Notice: Subject to any disclaimer, the term of this patent is extended or adjusted under 35 U.S.C. 154(b) by 61 days.

(21) Appl. No.: 16/312,870

(22) PCT Filed: Nov. 30, 2016

(86) PCT No.: PCT/CN2016/107909
§ 371 (c)(1),
(2) Date: Dec. 21, 2018

(87) PCT Pub. No.: WO2017/219605
PCT Pub. Date: Dec. 28, 2017

(65) Prior Publication Data
US 2019/0222143 A1 Jul. 18, 2019

(30) Foreign Application Priority Data

Jun. 23, 2016 (CN) .......................... 2016 1 0466387

(51) Int. Cl.
*H02N 1/04* (2006.01)
*A43B 3/00* (2006.01)
(52) U.S. Cl.
CPC ............. *H02N 1/04* (2013.01); *A43B 3/0015* (2013.01)

(58) Field of Classification Search
CPC ...................................................... H02N 1/04; H02N 1/002; H02N 1/08; H02N 1/00–12
(Continued)

(56) References Cited

U.S. PATENT DOCUMENTS

2013/0049531 A1* 2/2013 Wang ....................... H02N 1/04
310/309
2014/0300248 A1* 10/2014 Wang ....................... H02N 1/04
310/300

FOREIGN PATENT DOCUMENTS

CN 103776567 5/2014
CN 103840700 6/2014
(Continued)

OTHER PUBLICATIONS

International Search Report with English language translation of International Searching Authority corresponding to International Patent Application No. PCT/CN2016/107909 dated Mar. 27, 2017. (6 pages).

*Primary Examiner* — Thomas Truong
(74) *Attorney, Agent, or Firm* — Myers Bigel, P.A.

(57) ABSTRACT

A tubular friction nanogenerator and a cloth and an energy shoe including the same are provided. The tubular friction nanogenerator includes: a tubular friction layer, the friction layer being made of elastic material; an outer electrode layer covering an outer side of the tubular friction layer; an inner electrode layer having an outer surface, a portion or whole of which is attached to an inner surface of the friction layer, wherein in response to the tubular friction nanogenerator being restored after deformation, at least a portion of the inner electrode layer contacts and then is separated from an inner surface of the friction layer, so that a charge flow is generated between the inner electrode layer and the outer electrode layer.

20 Claims, 4 Drawing Sheets

(58) Field of Classification Search
USPC .......................... 310/300, 309, 310; 320/166
See application file for complete search history.

(56) References Cited

FOREIGN PATENT DOCUMENTS

| | | |
|---|---|---|
| CN | 204670496 | 9/2015 |
| CN | 105071685 | 11/2015 |
| WO | 2015043226 | 4/2015 |

* cited by examiner

Different Angles θ and Same Width D

Different Widths D and Same Angle θ

$d = D \sin\theta$

TUBULAR FRICTION NANOGENERATOR AND CLOTH AND ENERGY SHOE INCLUDING THE SAME

CROSS-REFERENCE TO RELATED APPLICATIONS

This application is a 35 U.S.C. 371 National Stage Application of International Application No. PCT/CN2016/107909, filed on Nov. 30, 2016 which claims priority to Chinese Application No. 201610466387.9, filed on Jun. 23, 2016, the contents of which are incorporated herein by reference in their entirety.

BACKGROUND OF THE DISCLOSURE

Field of the Disclosure

The present disclosure relates to a field of energy conversion, and more particularly to a tubular friction nanogenerator that converts applied mechanical energy into electrical energy, and a cloth and an energy shoe including the same.

Description of the Related Art

Fields of wearable electronic devices, smart manufacturing, health monitoring, motion tracking and the like are rapidly developing. Based on practical and aesthetic considerations, wearable electronic devices and their energy systems need to be continuously miniaturized, lightweight, flexible, and washable. Although there are some substantial breakthroughs in reducing the number of the power equipment and increasing energy density, there still exist many problems, such as a limited life of a battery and inconvenience of maintenance and replacement. One of the most promising technologies for solving the above problems is to collect energy directly from a working environment, so that the electronic devices can continuously work.

There are many possible ways of collecting energy. For example, solar cells can directly collect energy from sunlight, and pyroelectric generators can obtain energy through temperature difference. However, due to the intermittence of sunlight and the low pyroelectric output resulting from temperature difference of human body, these methods of collecting energy cannot guarantee a continuous operation of wearable electronic devices. Therefore, there is an active demand for developing an energy collection device that can work continuously and has a high output power.

SUMMARY

According to an aspect of the disclosure, a tubular friction nanogenerator is provided, including:

a tubular friction layer, the friction layer being made of elastic material;

an outer electrode layer covering an outer side of the tubular friction layer; and an inner electrode layer having an outer surface, a portion or whole of which is attached to an inner surface of the friction layer, wherein in response to the tubular friction nanogenerator being restored after deformation, at least a portion of the inner electrode layer contacts and then is separated from the inner surface of the friction layer, so that a charge flow is generated between the inner electrode layer and the outer electrode layer.

BRIEF DESCRIPTION OF THE DRAWINGS

FIG. 6b shows a graph of corresponding output performances of the helical type friction nanogenerators of FIG. 6a;

FIG. 7b shows a graph of corresponding output performances of the helical type friction nanogenerators of FIG. 7a.

FIG. 8b shows an amount of the corresponding output charge and the charge density of the helical type friction nanogenerator of FIG. 8a.

MAIN ELEMENTS

Figure 1:
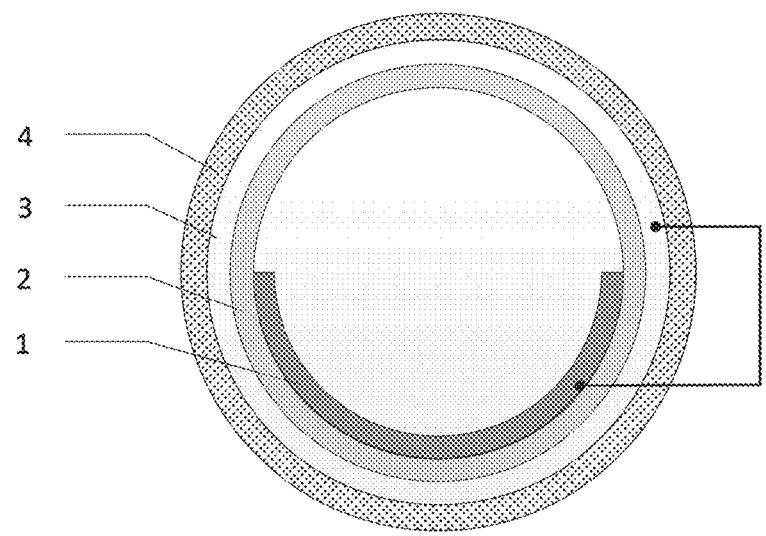
FIG. 1 is a schematic view showing a typical structure of a tubular friction nanogenerator according to an embodiment of the present disclosure.

1—inner electrode layer,
2—friction layer,
3—outer electrode layer,
4—protective layer.

DETAILED DESCRIPTION OF EMBODIMENTS

Several embodiments of the disclosure will be described more fully hereinafter with reference to the appended drawings. It should be known that only some but not all of embodiments are shown. In fact, the various embodiments of the disclosure may be implemented in many different forms and should not be construed as a limitation to the embodiments set forth herein. In contrast, these embodiments are provided so that the disclosure meets applicable legal requirements.

In order to make the objects, technical solutions and advantages of the present disclosure clearer and understood better, the present disclosure will be further described in detail below with reference to the specific embodiments of the disclosure and the accompanying drawings.

Triboelectric nanogenerators (TENG), which employs the principles of triboelectrification and electrostatic induction, can collect various available mechanical energies that are widely distributed. It may directly utilize various forms of mechanical energy in the surrounding environment, such as rotation, tapping, bending and lengthening. Since the triboelectric nanogenerator has the advantages of light weight, a small volume, a high efficiency and a wide range of selectable materials, it can be used as an energy source for wearable electronic devices and is attracting more and more attention.

The disclosure proposes, by structural design and material selection, a tubular friction nanogenerator capable of continuously driving a wearable electronic device by mechanical energy such as a motion of human body. This tubular friction nanogenerator has various good properties such as flexibility, plasticity, braidability, anisotropy, and water resistance.

The structure and performance of the tubular friction nanogenerator provided by the embodiments of the present disclosure will be described in detail below with reference to the accompanying drawings.

According to an exemplary embodiment of the present disclosure, in response to the tubular friction nanogenerator being restored after deformation, contacting and then separating at least a portion of the inner electrode layer from the inner surface of the friction layer includes contacting and then separating an inner surface of the inner electrode layer from a portion, to which the inner electrode layer is not attached, of the inner surface of the friction layer.

According to another exemplary embodiment of the present disclosure, a material of the inner electrode layer and a material of the friction layer are different in electron donating and accepting capabilities.

According to another exemplary embodiment of the present disclosure, the inner electrode layer has a strip shape. An angle $\theta$ is formed between a length extending direction of the inner electrode layer and a radial direction of the friction layer, and the angle $\theta$ meets a condition of $0° < \theta < 90°$.

According to another exemplary embodiment of the present disclosure, $d = D \times \sin \theta$, where D is a half of a perimeter of the inner surface of the friction layer, and d is a width of the strip-shaped inner electrode layer.

According to another exemplary embodiment of the present disclosure, $\theta$ is equal to 45°.

According to another exemplary embodiment of the present disclosure, the strip-shaped inner electrode layer has a width of 2-8 mm.

According to another exemplary embodiment of the present disclosure, the strip-shaped inner electrode layer has a width of 5 mm.

According to another exemplary embodiment of the present disclosure, the inner electrode layer has a strip shape, and a length extending direction of the inner electrode layer coincides with a length extending direction of the tubular friction layer.

According to another exemplary embodiment of the present disclosure, a cross section of the friction layer in a radial direction has an annular shape, an elliptical ring shape or an irregular ring shape under deformation.

According to another exemplary embodiment of the present disclosure, the inner electrode layer and/or the outer electrode layer is/are made of flexible electrode material.

According to another exemplary embodiment of the present disclosure the flexible electrode material is formed by mixing an insulating material with an electrically conductive micron-structured and/or nano-structured material.

According to another exemplary embodiment of the present disclosure, the electrically conductive micron-structured and/or nano-structured material include(s) carbon based electrically conductive material including an electrically conductive carbon black, carbon nanotube, or grapheme, or include(s) metal nanoparticle.

According to another exemplary embodiment of the present disclosure, the insulating material is a silicone rubber or an unvulcanized rubber.

According to another exemplary embodiment of the present disclosure, the friction layer is made of silicone rubber or unvulcanized rubber.

According to another exemplary embodiment of the present disclosure, the tubular friction nanogenerator further includes a protective layer covering the outer electrode layer and made of insulating flexible material to seal the tubular friction nanogenerator.

According to another aspect of the present disclosure, a cloth including the tubular friction nanogenerator described above is provided.

According to an exemplary embodiment of the present disclosure, the friction layer of the tubular friction nanogenerator is a circular tube having an inner diameter of 1-4 mm.

According to another aspect of the present disclosure, an energy shoe where the tubular friction nanogenerator described above is installed in a sole of the shoe and/or inside the shoe is provided.

According to an exemplary embodiment of the present disclosure, the friction layer of the tubular friction nanogenerator is a circular tube having an inner diameter of 5-15 mm.

FIG. 1 is a schematic view showing a typical structure of a tubular friction nanogenerator according to an embodiment of the present disclosure. The generator includes: a tubular friction layer 2 which is made of an elastic material and can be pressed and flattened, or twisted and deformed, in a radial direction when subjected to an external force, the tubular friction layer being able to be elastically restored to its original shape when the external force is removed; a flexible outer electrode layer 3 covering an outer side of the tubular friction layer 2; a flexible inner electrode layer 1 which has a strip shape and a portion or the whole of an outer surface of which is attached to an inner surface of the tubular friction layer 2; wherein when the applied external force is removed, a portion or the whole of the inner surface of the inner electrode layer 1 contacts and then is separated from a portion, to which the inner electrode layer 1 is not attached, of the inner surface of the friction layer 2, and wherein a charge flow is generated between the inner electrode layer 1 and the outer electrode layer 3 in the process of the deformation.

For convenience of description, a surface of the flexible inner electrode layer 1 facing a cavity in the tubular friction layer 2 is referred to as the inner surface of the flexible inner electrode layer 1.

The flexible inner electrode layer 1 is disposed on, preferably in close contact with, the inner surface of the tubular friction layer 2, and can be deformed following the deformation of the friction layer 2 when subjected to an external force.

Figure 2:
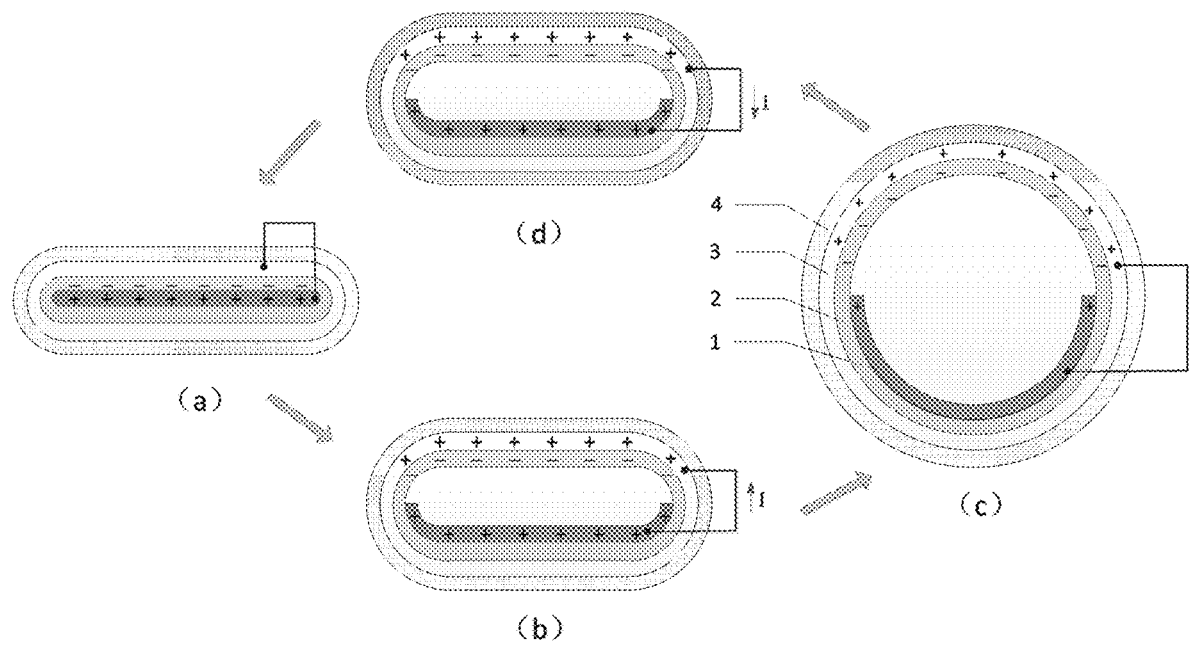
FIG. 2 is a schematic view showing the principle of a power generation process of the tubular friction nanogenerator shown in FIG. 1.

The working principle of the friction nanogenerator is based on the coupling effect of the friction effect and the electrostatic induction. The power generation process of the tubular friction nanogenerator described in the embodiments of the present disclosure is shown in FIG. 2. The inner surface of the flexible inner electrode layer 1 and the inner surface of the friction layer 2 are in contact with each other under the action of an external force (for example, a pressing force in a radial direction of the tubular friction layer). Since the material of the inner surface of the flexible inner electrode layer 1 and the material of the inner surface of the friction layer 2 are different in electron donating and accepting capability, and the material of the inner surface of the friction layer 2 preferably has a higher electron accepting ability, electrons will transfer from the surface of the inner electrode layer 1 to the inner surface of the friction layer 2. Then, the inner electrode layer 1 is positively charged, and the inner surface of the friction layer 2 is negatively charged, as shown in FIG. 2(a). If the inner surface of the friction layer 2 is insulated, the surface triboelectric charges can be retained for a long time. When the pressing force is released, since the tubular friction layer 2 has elasticity, the inner surface of the inner electrode layer 1 and the inner surface of the friction layer 2 are separated by the elastic restoring force, and the outer electrode layer 3 will be induced to be positively charged. Thus, electrons on the outer electrode layer 3 can flow through a load to the inner electrode layer, as shown in FIG. 2(b), and finally a potential balance is reached, as shown in FIG. 2(c). When a pressing force is applied again, electrons may flow from the inner electrode layer 1 back to the outer electrode layer 3, as shown in FIG. 2(d) until the inner surface of the inner electrode layer 1 comes into contact with the inner surface of the friction layer 2 and a new balance is reached. Therefore, an alternating current may be output by periodically applying a pressing force to the tubular friction nanogenerator.

The deformable properties of the flexible inner electrode layer and the outer electrode layer may further be different from each other depending on the applied force. If the applied force only relates to the pressing force (such as a pressing force in the radial direction), the flexible inner electrode layer and the outer electrode layer may be made of flexible materials such as an aluminum foil, a copper foil or the like, or is made by plating a conductive material on a flexible material to form a flexible electrode.

If mechanical energy in the form of pressing force, pulling force, twisting, bending, and the like is to be collected, the inner electrode layer and the outer electrode layer are further required to be made of stretchable materials to accommodate the deformation of the friction layer.

In an embodiment of the present disclosure, both the flexible inner electrode layer 1 and the outer electrode layer 2 may be of a stretchable structure, which is made of a flexible conductive material and may be obtained by mixing conductive carbon black and carbon nanotubes with stretchable rubber. Here, a specific preparation process is introduced to describe the process of obtaining a flexible conductive material, but the protection range of the present disclosure is not intended to be limited thereto. First, two basic liquids of a silicone rubber (Ecoflex 00-30) having a volume ratio of 1:1 are mixed to obtain liquid silicon rubber. Then, a mixture of conductive carbon black (CB) and carbon nanotubes (CNTs) (mass ratio of 2:1) is added. After uniformly mixed, the mixture was applied to a pretreated sheet and then heat treatment is performed at 30° C. for 5 hours to obtain a flexible stretchable conductive electrode layer material. The size of the electrode layer may be adjusted by cutting. Conductive carbon black provides the primary electrical conductivity. Carbon nanotube not only increases the electrical conductivity at high pressing forces, but also increases the frictional contact area due to the nanostructure of the surface thereof. The flexible silicone rubber, used as a base material of the electrode layer, imparts a high contact effect.

In addition, in addition to silicone rubber, other insulating materials, such as other rubber materials that are not vulcanized, other organic flexible materials, and the like, can also be used as the base material of flexible electrode material. A stretchable conductive material can be obtained as long as a conductive micro-structured/nano-structured material is mixed into the insulating material that can be liquefied and then the mixture is solidified. The conductive micro-structured/nano-structured material may be a conductive material, for example, a carbon-based conductive material such as conductive carbon black, carbon nanotubes, graphene, or metal nanoparticles.

A portion of the prepared flexible conductive material may be cut into a strip-shaped electrode layer with a width of 5 mm to serve as the flexible inner electrode layer 1, and another portion may be bonded to the outer surface of the tubular friction layer (silicone rubber) to serve as the flexible outer electrode layer 3.

Figure 3:
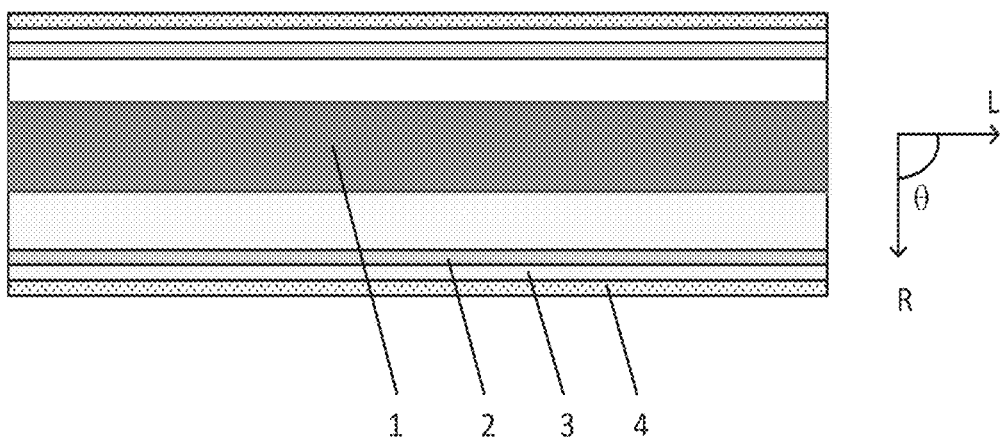
FIG. 3 is a schematic cross-sectional structural view of a straightly-spreading type tubular friction nanogenerator according to an embodiment of the present disclosure.
Figure 4:
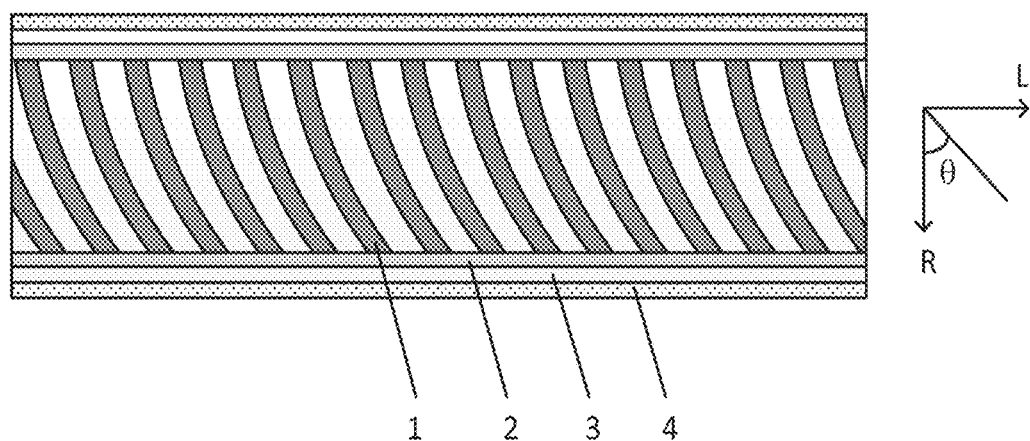
FIG. 4 is a schematic cross-sectional structural view of a helical type tubular friction nanogenerator according to an embodiment of the present disclosure.

FIG. 3 and FIG. 4 are schematic cross-sectional views of a tubular friction nanogenerator taken in a length direction according to an embodiment of the present disclosure. Referring to FIG. 3, the strip-shaped inner electrode layer 1 may be disposed in a length extending direction L of the tubular friction layer 2. The inner electrode layer 1 is parallel to an axial direction of the tubular friction layer 2. This structure may be referred to as a straightly-spreading type friction nanogenerator. Referring to FIG. 4, the strip-shaped inner electrode layer 1 may also be arranged in a helical shape. An angle θ is formed between the length extending direction of the strip-shaped inner electrode layer 1 and a radial direction R of the tubular friction layer 2, and the angle θ meets a condition of 0°<θ<90°. This structure may be referred to as a helical type friction nanogenerator.

In an embodiment of the present disclosure, the material employed by the tubular friction layer 2 needs to have elasticity, so that it may be deformed when an external force is applied in any direction and restored to its original state when the external force is removed. The external force includes a force in form of rotation, tapping, bending, extrusion, lengthening, and the like. Materials that may be selected include insulators such as silicone rubber and unvulcanized rubber. The friction layer 2 which employs a silicone rubber material is taken as an example. This material has a strong tendency to accept electrons, has good flexibility and scalability in various dimensions, and thus is a preferable material in the present disclosure.

When the external force is not applied, the shape of the cross section of the tubular friction layer 2 in the radial direction may be an annular shape, an elliptical ring or an irregular ring shape. The width of the ring in the radial cross section is equal to the thickness of the tubular friction layer 2, and a half, D, of a perimeter of the inner surface of the friction layer is a dimension which is measured when the tubular friction layer 2 is completely pressed and flattened to be horizontal (as shown in FIG. 2(a). The thickness of the tubular friction layer 2 is appropriately selected according to the size of the inner diameter of the tubular structure as long as the elastic deformation of the tubular friction layer can be ensured. It should be noted that the cross section in the radial direction means a section perpendicular to the axial direction.

The distance between adjacent portions of the internal electrode layer 1 in the longitudinal direction of the tubular friction layer 2 may be equal to the width of the internal electrode layer 1.

In order to protect the tubular friction nanogenerator, a protective layer 4 may further be provided over the outer surface of the outer electrode layer 3. As shown in FIG. 1, the protective layer 4 entirely encapsulates the outer electrode layer 3, the friction layer 2 and the inner electrode layer 1. The protective layer 4 may be made of an insulating flexible material, for example, a flexible insulating material such as silicone rubber.

Figures 5A, 5B, 5C:
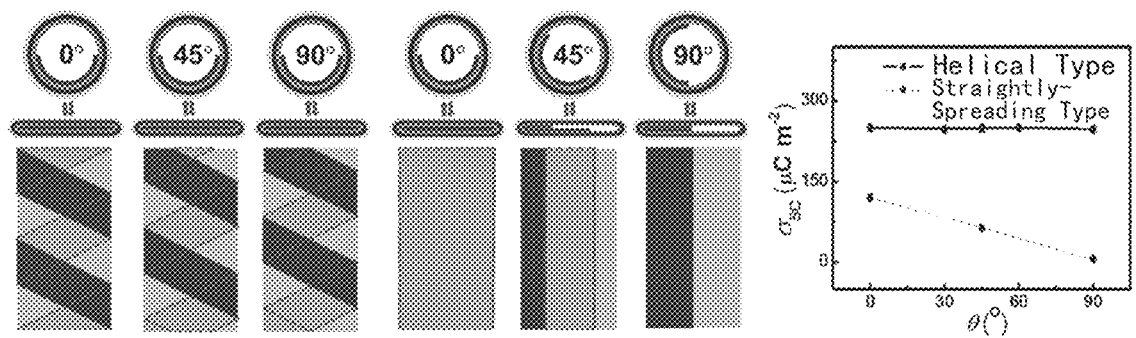
FIG. 5a is a schematic view showing a state in which an inner electrode layer and a friction layer are in contact with each other with a helical type friction nanogenerator being collapsed at different pressing oblique angles.
FIG. 5b is a schematic view showing a state in which the inner electrode layer and the friction layer are in contact with each other with a straightly-spreading type friction nanogenerator being collapsed at different pressing oblique angles.
FIG. 5c shows a comparative graph of corresponding charge densities $\sigma_{sc}$ of the two friction nanogenerators shown in FIGS. 5a and 5b at different pressing oblique angles.

The helical type friction nanogenerator (having a structure shown in FIG. 4) has considerable advantages over the straightly-spreading type friction nanogenerator (having a structure shown in FIG. 3). Firstly, in the case of the same size, the straightly-spreading type friction nanogenerator has a charge density of 110 $\mu Cm^{-2}$, which is much smaller than that of the helical type friction nanogenerator, as shown in the graph in FIG. 5c. Secondly, when pressed in different directions, the charge density of the helical type friction nanogenerator remains substantially the same (see FIG. 5a and FIG. 5c); however, the straightly-spreading type friction nanogenerator has a greater sensitivity to the pressing direction. When the pressing force is applied at an angle of 90°, the charge density of the straightly-spreading type friction nanogenerator almost tends to be 0 (FIG. 5b and FIG. 5c). FIGS. 5a and 5b are respectively schematic views showing the states in which a helical type friction nanogenerator and the straightly-spreading type friction nanogenerator are collapsed at pressing oblique angles of 0°, 45°, and 90°, where the pressing oblique angle is an angle between the pressing direction and the vertical direction in the cross-sectional view shown in FIG. 1. FIG. 5c shows a comparative graph of the corresponding charge densities $\sigma_{sc}$ for the two friction nanogenerators shown in FIG. 5a and FIG. 5b at different pressing oblique angles. The stable output performance exhibited by the helical type friction nanogenerators is attributed to its perfect symmetrical structure, which keeps the contact area constant when pressed in different directions. In addition, it is known through experimental measurement that, the helical type friction nanogenerator exhibits an optimal stable output performance under the action of external forces in different directions when the angle θ is of 45°.

The surface charge density of the helical type friction nanogenerator may be increased up to 250 $\mu Cm^{-2}$, and the excellent output performance is mainly attributed to two aspects. Firstly, good contact between the soft plastic material and the surface of the nanostructure greatly improves the contact efficiency, thereby increasing the output charge density. Secondly, the helical structure makes the close contact more efficient, which further increases the output charge density. The narrow helical strip-shaped contact surface is divided into a plurality of small segments (such as parallelograms marked with dotted lines in FIG. 5a), which reduces the possibility of insufficient contact due to the roughness of the contact surfaces.

Figure 6A:
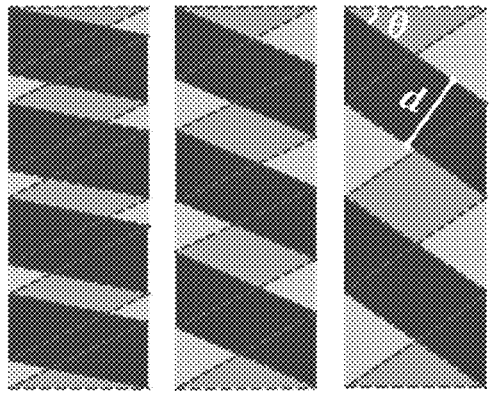
FIG. 6a is a schematic view showing a state in which the inner electrode layer and the friction layer in the helical type friction nanogenerator are in contact with each other when the width of the inner electrode layer is constant and when the angles θ between the inner electrode layer and the radial direction of the friction layer varies.
Figure 6B:
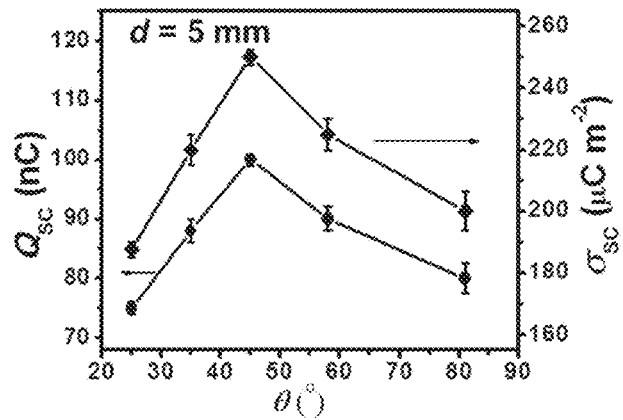
Figure 7A:
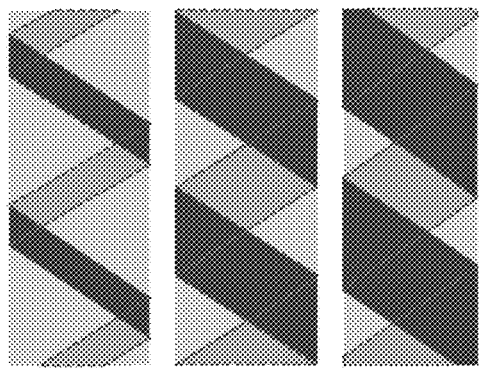
FIG. 7a is a schematic view showing a state in which the inner electrode layer and the friction layer in the helical type friction nanogenerator are in contact with each other when the angles θ between the inner electrode layer and the radial direction of the friction layer is constant and when the width of the inner electrode layer varies.
Figure 7B:
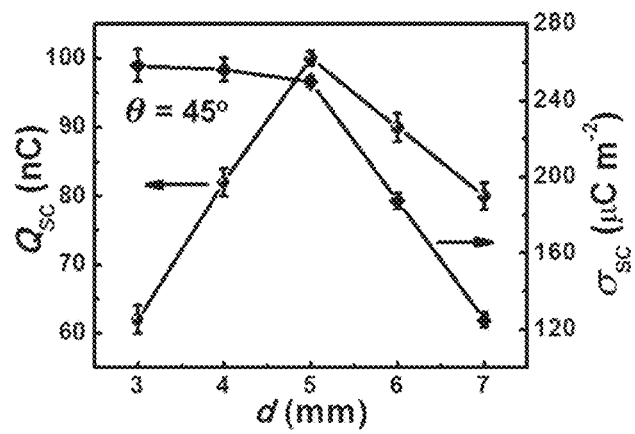
Figure 8A:
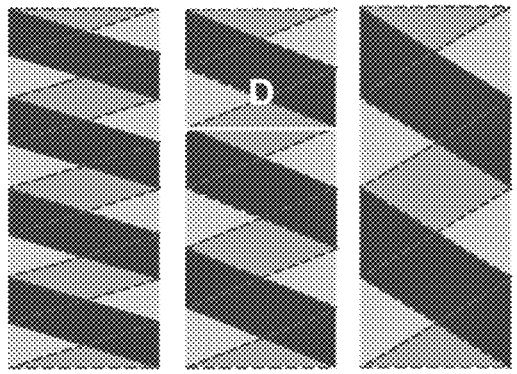
FIG. 8a is a schematic view showing a state in which the inner electrode layer and the friction layer are in contact with each other when the helical type friction nanogenerator satisfies the equation: d=D×sin θ.
Figure 8B:
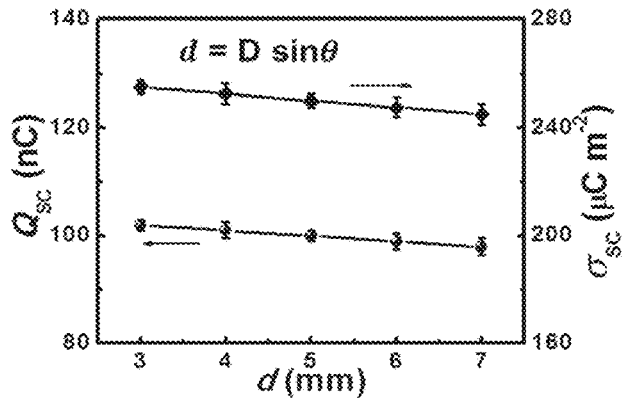

Since the amount of the output charge of the friction nanogenerator increases with the increase of the contact area between the inner surface of the inner electrode layer 1 and the inner surface of the friction layer 2, the charge density is generally used as a performance index for measuring performance of the friction nanogenerator. For the helical strip-shaped friction nanogenerator, once the total contact area between the inner surface of the inner electrode layer 1 and the inner surface of the friction layer 2 is determined, the single maximum charge output is consistent with the highest charge density by appropriately adjusting the following geometric parameters: the width d of the inner electrode layer 1; the angle θ between the length extending direction of the inner electrode layer 1 and the radial direction R of the friction layer 2; and the half D of the perimeter of the inner surface of the friction layer. In addition, FIG. 6a shows a schematic view of the state in which the inner electrode layer and the friction layer are in contact with each other in a collapsed state of the helical type friction nanogenerators having the same width d of inner electrode layer and different angles θ, and FIG. 6b shows a graph of the charge amount $Q_{sc}$ and the charge density $\sigma_{sc}$ of the helical type friction nanogenerators having the same width d of inner electrode layer and different angles θ, as shown in FIGS. 6a and 6b. When the width d is a constant, for example, d=5 mm, the maximum charge amount and the maximum charge density can be achieved simultaneously at θ=45° (as shown in FIG. 6a and FIG. 6b). FIG. 7a is a schematic view showing the state in which the inner electrode layer and the friction layer are in contact with each other in a collapsed state of helical type friction nanogenerators having different widths d of inner electrode layer and the same angle θ, and FIG. 7b shows a graph of the charge amount $Q_{sc}$ and the charge density $\sigma_{sc}$ of the helical type friction nanogenerators having the same angles θ and different widths d of inner electrode layer, as shown in FIGS. 7a and 7b. Taking the case in which θ is equal to 45° as an example, the amount $Q_{sc}$ of transferred charge exhibits a tendency of increasing firstly and then decreasing with the increase of d, which is attributed to the following fact that: when d is too small, the contact surface of the inner surface of the friction layer is too small; and when d is too large, the overlapping surface of the inner electrode layer 1 is too large. The charge density $\sigma_{sc}$ decreases with the increase of d. For a friction nanogenerator with a determined size, when the optimized value of d is 5 mm, the corresponding maximum charge amount $Q_{sc}$ and maximum charge density $\sigma_{sc}$ are 100 nC and 250 $\mu Cm^{-2}$, respectively. It is experimentally known for the inventor that, in order to obtain an excellent output performance of the friction nanogenerator, the relationship between the three parameters meets: d=D×sin θ. FIG. 8a is a schematic view showing the state in which the inner electrode layer and the friction layer are in contact with each other in a collapsed state of a helical type friction nanogenerator meeting the above relationship, and FIG. 8b shows a graph of the charge amount $Q_{sc}$ and the charge density $\sigma_{sc}$ of the helical type friction nanogenerators meeting the above relationship and having different widths d of inner electrode layer. As shown in FIGS. 8a and 8b, the charge amount $Q_{sc}$ and the charge density $\sigma_{sc}$ of the helical type friction nanogenerator decrease as the width d of the inner electrode layer increases.

For a tubular friction nanogenerator with a general size, the width d of the strip-shaped inner electrode layer 1 may vary according to the inner diameter of the friction layer 2, and the strip-shaped inner electrode layer 1 may have a width ranging from 2 mm to 8 mm.

Figure 9:
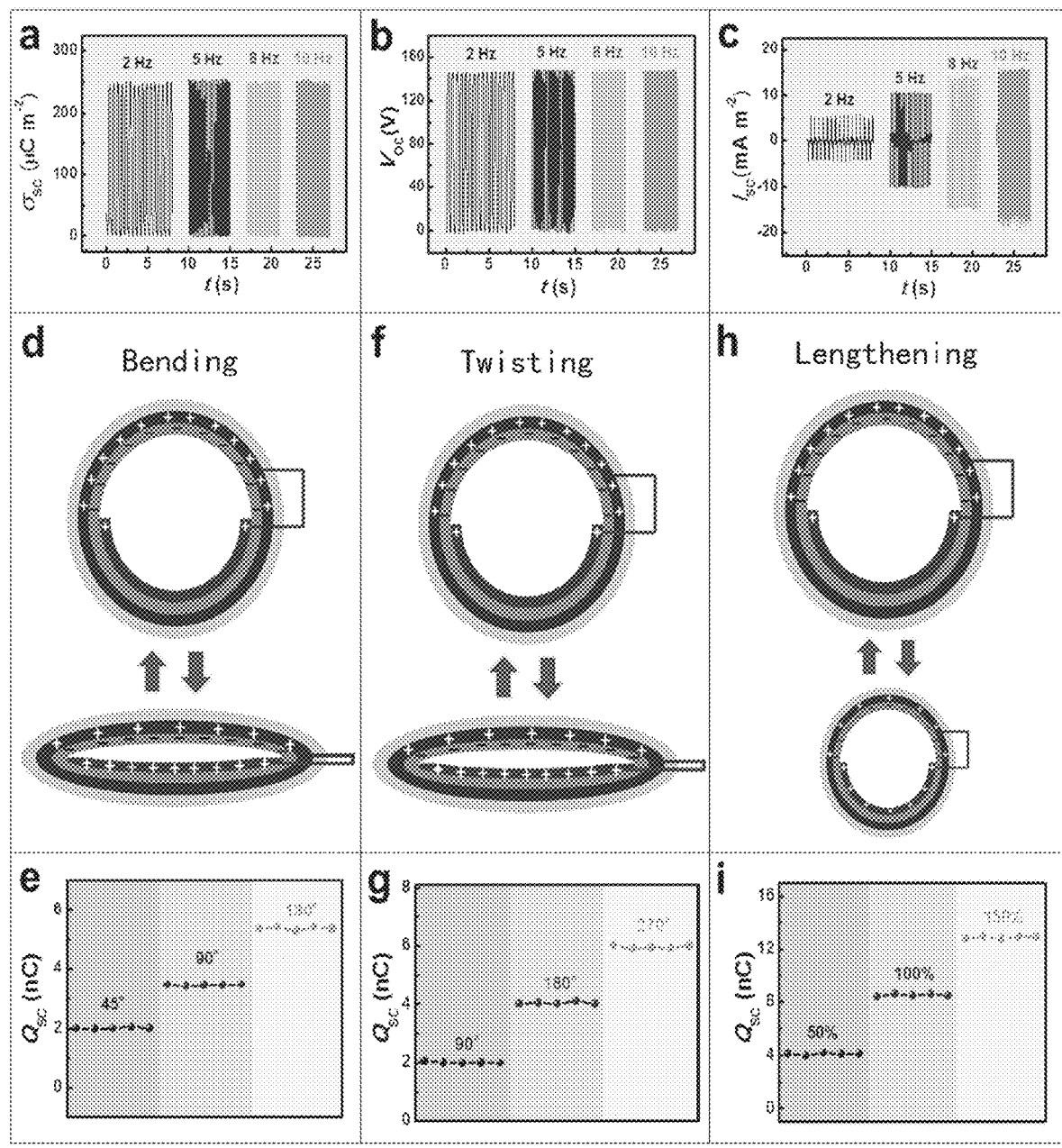
FIG. 9 shows the output of the generator of the present disclosure when being subjected to different forms of external force.

Because the helical friction nanogenerators have good flexibility and elasticity, in addition to converting deformation caused by pressing force into electrical energy, it can further convert other forms of deformation, such as bending, twisting and lengthening, into electrical energy. FIG. 9 shows states of energy collection of a helical type friction nanogenerator in which the frictional layer 2 employs a circular tube in shape and which has an inner diameter of 7 mm, an inner electrode layer having a width d of 5 mm, and an angle θ of 45° when subjected to various deformation energies. Figures a, b and c in FIG. 9 respectively show the relationships among the charge amount $Q_{sc}$, the open circuit potential V, the short circuit current density $I_s$, and the deformation frequency of the helical type friction nanogenerator. When subjected to a pressing force, as shown by Figures a, b, and c in FIG. 9, the peaks of the charge amount $Q_{sc}$ and the open circuit potential V are respectively 250 $\mu Cm^{-2}$ and 145 V, and remain unchanged at different deformation frequencies. At the same time, the short-circuit current density $I_{sc}$ increases with the increase of the deformation frequency, from 5 $mAm^{-2}$ (2 Hz) to 16 $mAm^{-2}$ (10 Hz). According to the optimization of the geometric parameters discussed above, for a helical type friction nanogenerator, when the overall size, such as the diameter of the tube, changes, the amount of its output charges will accordingly change and its charge density will remain unchanged. For example, when the diameter of the friction layer of the friction nanogenerator is 3 mm, the amount of the measured transferred charges is 45 nC, and the charge density is still maintained at about 250 $\mu Cm^{-2}$. Figures d, f and h in FIG. 9 respectively show a discharging mode in which the helical type friction nanogenerator is subjected to a bending force, a twisting force, and a lengthening force respectively. Figures e, g and i in FIG. 9 respectively show the relationships between the charge amount $Q_{sc}$ and the deformation amount in three power generation modes in which the friction nanogenerator is subjected to a bending force, a twisting force, and a lengthening force respectively. For the state in which the bending force and the twisting force are applied, referring to figures d and f in FIG. 9, the deformation of the friction nanogenerator is similar to the deformation caused by a local pressing. When the bending angle is changed from 45° to 180°, the amount of the output charges in the friction nanogenerator increases from 2 nC to 5.2 nC (figure e in FIG. 9). When the twisting angle is changed from 90° to 270°, the amount of the charges increases from 2 nC to 6 nC (figure g in FIG. 9). In the process of being subjected to the lengthening force, as shown in figure h in FIG. 9, the tube length increases, the tube diameter decreases, and they change periodically. When the lengthening amount is increased from 50% to 150%, the amount of charges increases from 4 nC to 12.5 nC (as shown in figure i in FIG. 9).

The tubular friction nanogenerator provided by the disclosure has excellent stability, and the charge density remains unchanged after being pressed 3 million times at a frequency of 10 Hz. This excellent characteristic enables the tubular friction nanogenerator to effectively serve as a supporting energy source. For example, a tubular friction nanogenerator can be installed in the sole or inside the shoe so that an "energy shoe" is produced. When a friction nanogenerator is installed in the sole or in the shoe, the friction layer has a circular tube shape and an inner diameter of 5-15 mm.

In addition, the tubular friction nanogenerator provided by the present disclosure may be woven into a cloth, serve as a portion of the cloth, and be located at a site of the human with a relatively large deformation in moving so that the energy of the human body can be collected. The friction layer has a circular tube shape and an inner diameter of 1-4 mm.

In order to protect the tubular friction nanogenerator, a protective layer may also be disposed over the outer surface of the outer electrode layer, and the protective layer may be of an flexible insulating material such as silicone rubber. After a wire connected to the electrode layer is led out, the protective layer can completely seal the tubular nanogenerator. Since the tubular nanogenerator is well packaged, it has the advantages of light weight, high water resistance and corrosion resistance. The friction nanogenerator has better practicability compared with the wearable power device made of traditional solid-state metal materials. When immersed in water for multiple swings, TENG still maintains an output charge density of 250 $\mu Cm^{-2}$, and can fully illuminate 32 LEDs by manual tapping after lifted from the water (as shown in FIG. 4a). When TENG is woven in the sole or safety vest, it can illuminate the warning signs of LED lights in the clothing, such as "CAUTION", "PASS", and "STOP" when a person walks or taps it. In the experiment, two TENGs were pressed by hand to charge the supercapacitor. Increasing the potential from 0 to 70 mV only took 70 seconds, and the equivalent constant current was calculated to be 1.4 μA. A temperature/humidity meter can be continuously driven by tapping 5 parallel-connected TENGs. These experimental results all show that the friction nanogenerator provided by the present disclosure can be used as a power source for wearable devices.

As can be seen from the above technical solutions, the present disclosure can provide the following advantages:

Since an elastic friction layer of a tubular structure is employed in the present disclosure, a flexible inner electrode layer is disposed over an inner surface of the friction layer, and a flexible outer electrode layer is disposed over the outer surface of the friction layer, the inner surface of the inner electrode layer can contact and then is separated from the inner surface of the friction layer when subjected to an external force. Due to the coupling effect of the friction effect and the electrostatic induction, a charge flow is generated between the inner electrode layer and the outer electrode layer, so that various available mechanical energies, such as rotation, tapping, bending and lengthening, which are widely distributed and can be conveniently collected everywhere, can be converted into electric energy.

In the present disclosure, a composite consisting of an electrically conductive carbon material (electrically conductive carbon black, carbon nanotubes, etc.) and a silicone rubber is employed as an electrode material, which not only makes the electrode material and the assembled friction nanogenerator have advantages of flexibility, lengthenability, water resistance, corrosion resistance, light weight and low cost, but also increases the effective friction contact area and improves the output characteristics of the generator.

In the friction nanogenerator of the disclosure, the inner electrode layer employs a helical strip design and its structural parameters are optimized, so that the friction contact area is fragmented. Thus, the effective friction contact area is further increased, the output charge density is remarkably improved, and the output power of the generator is greatly improved, enabling directly driving the wearable electronic device through human motion without an aid of a power management circuit.

The friction nanogenerator of the present disclosure employs a tubular design, and the TENG performance of the tubular structure is extremely stable. The generator can directly collect various forms of mechanical energies. The diameter of the tube can be changed according to the requirements of the application, and a thin tube can be woven with the clothes together to become a wearable power source.

The friction nanogenerator of the disclosure may be equipped with a supercapacitor or a battery so as to constitute a self-charging energy system. Since the friction nanogenerator has the advantages of light weight, a small volume, a high efficiency and a wide range of selectable materials, it can be mounted under the sole or woven in the clothes. The friction nanogenerator directly collects the mechanical energy of walking or jogging motion of the human body. It can continuously drive various wearable electronic devices, such as electronic watches and smart bracelets, without the need for a large energy management circuit.

It should be noted that the shapes and dimensions of the various components in the drawings do not reflect real sizes and proportions, but merely illustrate the contents of the embodiments of the present disclosure.

The directional terms mentioned in the embodiments, such as "upper", "lower", "front", "back", "left", "right", etc., merely refer to the directions in the drawings, and are not intended to limit the protection scope of the present disclosure. The above embodiments can be used in combination with each other or with other embodiments depending on the considerations on design and reliability. That is, the technical features in different embodiments can be freely combined to form more embodiments.

It should be noted that the implementations that are not shown or described in the drawings or the description are all known to those skilled in the art and are not described in detail. In addition, the above definitions of the various elements and methods are not limited to the specific structures, shapes or manners mentioned in the embodiments, and those skilled in the art can simply modify or replace them.

The objects, the technical solutions, and the advantages of the present disclosure have been further described in detail in connection with the above specific embodiments. It is to be understood that the above-described contents are only exemplary embodiments of the present disclosure and are not intended to limit the present disclosure. All modifications, equivalent substitutions, improvements and the like that fall into the spirit and the principle of the present disclosure are intended to be included within the scope of the present disclosure.

What is claimed is:

1. A tubular friction nanogenerator, comprising:
    a tubular friction layer, the tubular friction layer comprising elastic material;
    an outer electrode layer covering an outer side of the tubular friction layer; and
    an inner electrode layer having an outer surface, a portion or whole of which is attached to an inner surface of the tubular friction layer,
    wherein in response to the tubular friction nano generator being restored after deformation, at least a portion of the inner electrode layer contacts and then is separated from the inner surface of the tubular friction layer, so that a charge flow is generated between the inner electrode layer and the outer electrode layer.

2. The tubular friction nanogenerator according to claim 1,
    wherein in response to the tubular friction nanogenerator being restored after deformation, contacting and then separating at least a portion of the inner electrode layer from the inner surface of the tubular friction layer comprises contacting and then separating an inner surface of the inner electrode layer from a portion, to which the inner electrode layer is not attached, of the inner surface of the tubular friction layer.

3. The tubular friction nanogenerator according to claim 1,
    wherein a material of the inner electrode layer and a material of the tubular friction layer are different in electron donating and accepting capabilities.

4. The tubular friction nanogenerator according to claim 1,
    wherein the inner electrode layer has a strip shape, and
    wherein an angle $\theta$ is formed between a length extending direction of the inner electrode layer and a radial direction of the tubular friction layer, and the angle $\theta$ meets a condition of $0°<\theta<90°$.

5. The tubular friction nanogenerator according to claim 4,
    wherein $d=D\times\sin\theta$,
    where D is a half of a perimeter of the inner surface of the tubular friction layer, and d is a width of the strip-shaped inner electrode layer.

6. The tubular friction nanogenerator according to claim 5,
    wherein $\theta$ is equal to 45°.

7. The tubular friction nanogenerator according to claim 4,
    wherein the strip-shaped inner electrode layer has a width of 2-8 mm.

8. The tubular friction nanogenerator according to claim 4,
    wherein the strip-shaped inner electrode layer has a width of 5 mm.

9. The tubular friction nanogenerator according to claim 1,
    wherein the inner electrode layer has a strip shape, and a length extending direction of the inner electrode layer coincides with a length extending direction of the tubular friction layer.

10. The tubular friction nanogenerator according to claim 1,
    wherein a cross section of the tubular friction layer in a radial direction has an annular shape, an elliptical ring shape or an irregular ring shape under deformation.

11. The tubular friction nanogenerator according to claim 1,
    wherein the inner electrode layer and/or the outer electrode layer comprise flexible electrode material.

12. A tubular friction nano generator according to claim 11,
    wherein the flexible electrode material is formed by mixing an insulating material with an electrically conductive micron-structured and/or nano-structured material.

13. The tubular friction nanogenerator according to claim 12,
    wherein the electrically conductive micron-structured and/or nano-structured material comprise(s) carbon based electrically conductive material comprising an electrically conductive carbon black, carbon nanotube, or grapheme, or comprise(s) metal nanoparticle.

14. The tubular friction nanogenerator according to claim 12,
wherein the insulating material comprises a silicone rubber or an unvulcanized rubber.

15. The tubular friction nanogenerator according to claim 1,
wherein the tubular friction layer comprises silicone rubber or unvulcanized rubber.

16. The tubular friction nanogenerator according to claim 1, further comprising:
a protective layer covering the outer electrode layer and comprising insulating flexible material to seal the tubular friction nanogenerator.

17. A cloth comprising the tubular friction nanogenerator according to claim 1.

18. The cloth according to claim 17,
wherein the tubular friction layer of the tubular friction nanogenerator is a circular tube having an inner diameter of 1-4 mm.

19. An energy shoe where the tubular friction nanogenerator according to claim 1 is installed in a sole of the shoe and/or inside the shoe.

20. The energy shoe according to claim 19,
wherein the tubular friction layer of the tubular friction nanogenerator is a circular tube having an inner diameter of 5-15 mm.

* * * * *